United States Patent Office 3,251,781
Patented May 17, 1966

3,251,781
ORGANO-METALLIC GEL-PRODUCING COMPOSITIONS AND PROCESSES FOR PREPARING ORGANO-METALLIC GELS
Wesley A. Jordan, Minneapolis, Minn., assignor to General Mills, Inc., a corporation of Delaware
No Drawing. Filed Aug. 21, 1961, Ser. No. 132,547
14 Claims. (Cl. 252—316)

This invention relates to organo-metallic gels and their method of preparation from certain polysaccharide gum materials mixed with certain metallic oxides or sulfides and an oxidizing agent.

Alkali-formed gels and gels formed by the addition of borax to gum sols are well known. In the borax gels, gum sols at concentrations in excess of 0.5% are cross-linked with borax and used as thickening and binding agents. However, borax gels are unstable under acid conditions and disintegrate and revert to a sol when adjusted to a pH of 6.5 or less. Of necessity, borax gels are alkaline to be completely stable. In some applications, such as slurry blasting agents, the gels must be mixed with ingredients such as ammonium nitrate, which, in water, has an acid pH. In such applications, gels unstable under acid conditions pose serious stability problems.

It has now been discovered that tough, rubbery gels may be produced with the use of certain gum materials, certain metallic oxides or sulfides and an oxidizing agent. These oxidizing agent gels employing metallic oxides or sulfides are valuable binding and thickening agents, exhibiting a high degree of electrolyte tolerance in general. These gels may be formed in saturated ammonium nitrate solutions. The gels also find utility in paper coatings. In such applications, the pigment becomes chemically bound in the coating rather than being bound by the siccative action of the gum.

Many of the gels are acid which is quite unexpected as gels from hydrophilic colloids which are acid are generally believed extremely difficult to form. The gels are stable under acid conditions and do not break down or synaerese. The acidic nature of the gels is important in industrial applications where they will be used as thickeners and binders in an acid environment. In addition to being stable under acid conditions, the gels are also stable when the pH is changed to the alkaline range.

Besides their unusual stability under variable pH conditions, these gels exhibit a high degree of water resistance. Water resistance is an important property for use of the gels as binders in certain applications such as slurry blasting agents by preventing the soluble agents therein from being dissolved.

It is, therefore, an object of this invention to provide novel organic-metallic gels.

It is also an object of this invention to provide gels stable under acid conditions.

Another object of this invention is to provide methods of preparation of such gels.

Still another object is to provide gels through the use of oxidizing agents.

Another object of this invention is to provide gels using metallic sulfides and oxides.

Other objects and advantages of this invention will be apparent from the following description.

Briefly, the novel gels may be formed by a variety of methods, for example, the metallic oxide or sulfide can be added to the sol of a hydrophilic colloid followed by the addition of oxidizing agent. Another procedure is to preblend the gum with the sulfide or oxide and disperse this mixture in water and then add oxidizing agent. A third procedure which may be employed to react the oxidizing agent with a sulfide first and then blend the product of this reaction with dry gum, which blend is then added to water, dispersed, allowed to swell and finally gel. This third procedure provides one example of a means of making a one-package system for making gels, eliminating the multiple step procedures of the first two methods.

The polysaccharides, which may be employed in this invention are water soluble gum materials which form hydrophilic colloids. By "gum products" as used in this invention is intended the following gum materials: galactomannan gums, such as guar, locust bean and tara; glucomannan gums such as Iles mannan gum; glucoxylogalactans such as tarmarind gum; glucose polymers such as waxy maize starch; xylogalactans such as psyllium seed gum; modified glycosides such as sodium carboxymethyl cellulose; propylene glycol esters of alginic acid and sodium alginate. These all react with metallic sulfides or oxides and an oxidizing agent to yield gels.

As stated previously, the sulfides and oxides of certain metals may be employed. Among the metals which may be employed are Sb, Zn, Mo, Cd, Pb, Bi, Mn, Ni, Co, Sn, Fe and Cu. The amount of metallic sulfide or oxide employed varies widely, as will be apparent from the examples to follow.

An important factor distinguishing the present gels from the alkali formed gels is the use of an oxidizing agent to effect gel formation. To provide the gels of the present invention, an oxidizing agent is required. The oxidizing agents may be sepaarted into two groups: those that contain a metal ion and those that do not. Illustrative of those containing a metal ion are the alkali metal chromates, bichromates and permanganates such as sodium bichromate and potassium permanganate, and the alkaline earth metal hypochlorites such as calcium hypochlorite. All these activate the formation of a complex between a metallic sulfide or oxide and a gum sol such as, for example, antimony oxide and a guar gum sol. Non-metal oxidizing agents also activate complex formation. Illustrative thereof are hydrogen peroxide, peracetic acid, periodic acid and nitric acid. The non-metal oxidizing agents alone have little or no effect on thickening a gum sol, and generally, their action usually thins a sol. However, when these are added to a sol containing the metal sulfide or oxide, the sol transforms to a gel. This demonstrates the function of the oxidizing agent in the gel formation of the present invention. It is thus quite unique that a gel of a hydrophilic colloid is produced once an oxidizing agent is added to a metallic oxide which in itself may be at its highest oxidation level. Other oxidizing agents will be illustrated in the examples to follow.

The invention may be better illustrated by means of the following examples in which all "parts" and "percentages" are by weight unless otherwise noted and where $Sb_2S_3$ is used, the black form was used unless otherwise noted.

These examples are given to demonstrate the versatility of the process for making gels by the previously discussed procedures and should not be considered as defining the limitations for producing gels. Furthermore, the following examples describing the properties of the gels and their uses are given only to demonstrate their value and should not be construed to be limited to the industrial applications cited.

Example 1

5.0 g. of guar gum were blended with 5.0 g. of antimony sulfide and this mixture was dispersed in 500 cc. of 25° C. water being agitated in a Waring blender. After 3 minutes 5 cc. of 5% $Na_2Cr_2O_7$ solution were added. In approximately two minutes, the fluid dispersion transformed into a rubbery gel. This gel had a pH of 5.8 and a viscosity of 210,000 as measured with a Brookfield Synchro-Lectric Viscometer, 10 r.p.m., No. 7 spindle.

Example 2

50 g. of $Sb_2S_3$ were dispersed in 75 cc. of 1% $H_2O_2$ solution. When the sulfide was added, the solution temperature rose from 22.8° C. to 27.8° C. in 5 minutes when 100 cc. of 25° C. water were added. The temperature dropped to 26.1° C., rose to 27° C. and 100 cc. of 25° C. water were added. At this point the temperature remained constant. The mixture was allowed to stand for 24 hours and the treated sulfide was filtered off. After drying the sulfide one week at room conditions, 20 grams of this reaction product were blended with 80 g. of guar gum.

5 g. of the gum sulfide mixture were blended with 300 g. of $NH_4NO_3$ and to this total blend were added 200 cc. of water at 200° C. After thoroughly stirring the slurry it was allowed to stand one week. The mixture slowly changed during this period to a stringy, then rubbery gel which had a pH of 6.6 and a viscosity of 120,000 cps. as measured by a Brookfield Synchro-Lectric Viscometer, No. 7 spindle at 10 r.p.m.

Example 2 demonstrates how a gel can be made, by first reacting the sulfide with an oxidizing agent and blending this reaction product with gum and then adding the total mixture to water. Example 3, which involves the making of 12 gels, each employing a different metallic sulfide, describes the procedure of first making a sol, adding a sulfide to it and then adding an oxidizing agent.

Example 3

Twelve sols were made, each containing 396 g. $H_2O$, 2 g. guar gum and 2 g. of metallic sulfide. The sulfides used were $Sb_2S_3$, ZnS, $Mo_2S_5$, CdS, PbS, $Bi_2S_3$, MnS, NiS, CoS, $SnS_2$, FeS, and CuS.

The procedure for making each sulfide containing sol consisted of first dispersing the gum in water, agitating for two minutes, then adding the metal sulfide and agitating for three minutes and finally adding 5 cc. of a 5% $K_2Cr_2O_7$ solution. The total mixture was then stirred with a spatula for 2–3 minutes and observed for gel properties.

All twelve mixtures were gels which formed within 2–3 minutes after oxidizing agent was added. They varied, however, in toughness and elastic properties but all had a viscosity in excess of 50,000 cps. which distinguishes them from a 2% guar sol which has a viscosity ranging from 10–15,000 cps. as measured with a Brookfield Synchro-Lectric Viscometer. Example 3 shows that many metallic sulfides may be used as a crosslinking agent to form a gel. However, all of the said sulfides are either water insoluble or very slightly soluble. Repeating the above example, but employing the soluble barium sulfide instead of an insoluble one, showed that this sulfide also crosslinked guar sol upon being oxidized with bichromate solution. However, the gel formed by barium sulfide was soft, stringy and smelled of $H_2S$. As used herein "water soluble" is meant having a solubility not in excess of the solubility of barium sulfide, BaS.

Examples 4–11

As stated previously, there are a number of oxidizing agents that may be employed to complex a hydrophilic colloid with a metallic sulfide or oxide. Examples 4–11 list several oxidizing agents which have proven effective.

Eight sols containing dispersed metal sulfide were made each by first dispersing 3 g. of guar gum in 300 cc. of 25° C. water and then adding to the dispersion 3 g. of $Sb_2S_3$. Each mixture was stirred 30 minutes. To each mixture was added an oxidizing agent as listed in Table I, and in the amount as shown. In some cases gel formation was immediate and in others, the gel formed some time later. The following table details the results of Examples 4–11.

TABLE I

| Ex. No. | Oxidizing Agent Added to Mixture of Gum-Water and $Sb_2S_3$ | Quantity of Oxidizing Agent Added, g. | Result of Adding Oxidizing Agent to Gum-Water $Sb_2S_3$ Mixture | pH |
|---|---|---|---|---|
| 4 | $K_2Cr_2O_7$ | .05 | Gelled immediately | |
| 5 | $CrO_3$ | .05 | ___do___ | |
| 6 | $K_2CrO_4$ | .1 | Gelled in 30 min | 7.2 |
| 7 | $KMnO_4$ | 1.5 | Gelled immediately | 7 |
| 8 | $H_2O_2$ | .042 | Gelled in 4 hrs | 4.9 |
| 9 | $Na_2O_2$ | .1 | Gelled immediately | 10.2 |
| 10 | $CH_3COOOH$ | .05 | ___do___ | 1.8 |
| 11 | $KIO_4$ | .1 | ___do___ | |

Examples 12–20

It was found that other hydrophilic colloids react with a metallic sulfide and oxidizing agent to yield gels. The hydrophilic colloids other than guar gum that were found to yield gels, within the scope of this invention, were carboxymethyl, cellulose, psyllium seed gum, propylene glycol ester of alginic acid, sodium alginate, locust bean gum, waxy maize starch, tamarind gum, Iles mannan, and tara gum.

A number of gels were made using the above hydrophilic colloids. To produce the gels from the said hydrophilic colloids, a sol of each was first prepared. The sols were made by adding each gum to cold water being vigorously agitated to make a slurry and then heating the slurry to 75° C. for 15 min. to swell the gum and form a sol. The heated sols were cooled to 25° C. and to 100 cc. of each was added red reprecipitated $Sb_2S_3$. The amount of $Sb_2S_3$ added to each sol is shown in Table II. After thoroughly mixing in the sulfide, a 5% $K_2Cr_2O_7$ solution was added and mixed with the sol-$Sb_2S_3$ mixture. The mixtures were then observed for gel properties.

TABLE II

| Ex. No. | Gum Used | Percent Gum in Sol. by Weight | Gms. of $Sb_2S_3$ Added to 100 cc. of Sol., g. | Ml. of 5 Percent $K_2Cr_2O_7$ Added to Gum-$Sb_2S_3$ Sol., ml. | Gel Characteristics |
|---|---|---|---|---|---|
| 12 | Na Carboxymethyl Cellulose | 1.5 | 1.5 | 3 | Firm rubbery gel. |
| 13 | Psyllium Seed | 10.0 | 4.0 | 14 | Soft gel which synerizes rapidly. |
| 14 | Propylene Glycol Ester of Alginic Acid | 2.0 | 2.0 | 4 | Gel forms slowly and is brittle rather than rubbery. |
| 15 | Sodium Alginate | 3.0 | 3.0 | 5 | Soft gel. |
| 16 | Locust Bean Gum | 1.5 | 2.0 | 4 | Firm rubbery gel. |
| 17 | Waxy Maize Starch | 3.0 | 3.0 | 3 | Thickens slowly and forms soft gel. |
| 18 | Tamarind | 3.0 | 3.0 | 4 | Rubbery, tacky gel. |
| 19 | Iles Mannan | 1.5 | 2.0 | 4 | Firm, rubbery gel. |
| 20 | Tara | 1.5 | 2.0 | 4 | Do. |

Table II reports the results of Examples 12–20. This table shows the percent of gum in the sol by weight, the grams of $Sb_2S_3$ added to the respective sol, the milliliters of 5% $K_2Cr_2O_7$ solution added and a description of the gel after being formed.

The following Table IIA will further illustrate the effect of various levels of $Sb_2S_3$ (reprecipitated red form) using 1% guar gum sols in the absence and presence of an oxidizing agent, $K_2Cr_2O_7$.

TABLE IIA

| Percent Gum | Percent $Sb_2S_3$ | Viscosity,[1] cps. | | pH After Addition $K_2Cr_2O_7$ |
|---|---|---|---|---|
| | | 180 Min. Before Addition $K_2Cr_2O_7$ | 20 hrs. After Addition 0.25 g. $K_2Cr_2O_7$ | |
| 100 | 0 | 2,700 | 4,400 | 5.7 |
| 99 | 1 | 2,575 | 6,000 | 5.9 |
| 97 | 3 | 2,400 | 12,000 | 5.8 |
| 95 | 5 | 2,225 | 22,800 | 6.0 |
| 90 | 10 | 1,875 | 40,400 | 6.1 |
| 80 | 20 | 1,250 | 40,800 | 6.5 |

[1] Brookfield Synchro-Lectric No. 3 spindle, 20 r.p.m.

When a blend of antimony sulfide and guar gum is dispersed in water, the mixture thickens and becomes a sol. The amount of viscosity developed by said sol is a function of the precent gum present and not the percent sulfide present. However, after an oxidizing agent is added to said sol containing a sulfide, a gel is formed and the strength of the gel, as measured by viscosity, is dependent on the percent sulfide present. In a series of tests, six portions of guar gum, 4 g. each, were blended with antimony sulfide as shown in Table III.

TABLE III

| Blend No. | Wt. of Guar Gum, g. | Wt. of $Sb_2S_3$ Added, g. | Percent $Sb_2S_3$ Based on Gum | Total Weight of Mixture, g. |
|---|---|---|---|---|
| 1 | 4 | 0 | --- | 4.0 |
| 2 | 4 | 0.02 | .5 | 4.02 |
| 3 | 4 | 0.04 | 1.0 | 4.04 |
| 4 | 4 | 0.4 | 10.0 | 4.4 |
| 5 | 4 | 0.8 | 20.0 | 4.8 |
| 6 | 4 | 1.6 | 40.0 | 5.6 |

Each blend was dispersed in 400 ml. of water at 25° C. and stirred two hours. Viscosity measurements on the dispersions were made hourly. Four hours after the dispersions were made 2% $Na_2Cr_2O_7$ was added on the basis of the total weight of gum and $Sb_2S_3$ in the sol. The $Na_2Cr_2O_7$ was added as a 5% solution and was thoroughly mixed into the sol. Sols of Blends 4, 5 and 6 immediately turned to gels. The viscosity of all 6 sols/gels was determined 20 hours after dichromate was added. Table IV shows the viscosity of each sol made from each respective blend shown in Table III as it developed during the four-hour hydration period. The table also shows the viscosity of the sol or gel after $Na_2Cr_2O_7$ was added.

The data in Table IV shows that the viscosity development before $Na_2Cr_2O_7$ is added is a function of the percent gum present. The viscosity of the mixture after $Na_2Cr_2O_7$ is added is a function of the percent $Sb_2S_3$ present.

TABLE IV

| | Brookfield Viscosity [1] (cps.) of Sols/Gels | | | | | |
|---|---|---|---|---|---|---|
| Blend No. | 1 | 2 | 3 | 4 | 5 | 6 |
| Percent $Sb_2S_3$ basis gum | 0% | 0.5% | 1.0% | 10.0% | 20.0% | 40.0% |
| Time: | | | | | | |
| 15 min | 950 | 925 | 925 | 950 | 925 | 850 |
| 30 min | 1,375 | 1,375 | 1,375 | 1,375 | 1,350 | 1,300 |
| 60 min | 1,875 | 1,875 | 1,875 | 1,850 | 1,900 | 1,800 |
| 120 min | 2,225 | 2,300 | 2,250 | 2,275 | 2,325 | 2,225 |
| 180 min | 2,325 | 2,450 | 2,325 | 2,300 | 2,350 | 2,250 |
| 240 min | 2,375 | 2,375 | 2,400 | 2,350 | 2,400 | 2,325 |
| Percent $Na_2Cr_2O_7$ added basis gum plus $Sb_2S_3$ | 2 | 2 | 2 | 2 | 2 | 2 |
| Viscosity 20 hrs. after $Na_2Cr_2O_7$ added | 1,775 | 1,875 | 2,025 | [2] 20,000 | [2] 90,000 | [2] 70,000 |

[1] Brookfield Synchro-Lectric Viscometer, 20 r.p.m.—No. 3 spindle.
[2] No. 7 spindle used to measure gel viscosities.

It was found that this conclusion also applies when antimony oxide is substituted for antimony sulfide in the above experiments. The data obtained when antimony oxide is substituted for antimony sulfide is summarized in Table V. This table shows the viscosity development rate of sols made from mixtures of guar gum and antimony oxide blended in the same proportions as the sulfide gum mixtures described in Table III.

TABLE V

| | Brookfield Viscosity (cps.) of Sols/Gels | | | | | |
|---|---|---|---|---|---|---|
| Blend No. | 1 | 2 | 3 | 4 | 5 | 6 |
| Percent $Sb_2O_3$ Added | 0% | 0.5% | 1.0% | 10.0% | 20.0% | 40.0% |
| Time: | | | | | | |
| 1 Hr | 1,900 | 2,000 | 1,975 | 1,800 | 1,925 | 1,925 |
| 2 Hrs | 2,400 | 2,325 | 2,275 | 2,175 | 2,275 | 2,200 |
| 3 Hrs | 2,350 | 2,500 | 2,375 | 2,250 | 2,350 | 2,300 |
| 4 Hrs | 2,350 | 2,450 | 2,525 | 2,325 | 2,525 | 2,375 |
| Percent $Na_2Cr_2O_7$ added basis gum plus oxide | 2 | 2 | 2 | 2 | 2 | 2 |
| Viscosity 20 Hrs. after Dichromate added | 1,750 | 2,025 | 2,050 | 110,000 | 130,000 | 100,000 |

An inspection of the data in Tables IV and V points to the most desirable level of antimony oxide or sulfide required in the blend to achieve the maximum gel viscosity. The data also shows that in a blend of guar gum and antimony oxide or antimony sulfide the most desirable level of oxide or sulfide is reached when the gum is in excess of 1% basis the gum weight.

From the foregoing examples, it is apparent that widely differing gels may be provided. This allows for the provision of a gel having properties desirable for a particular application or use. Thus, gels may be provided meeting a wide variety of requirements.

Example 21

Twenty grams of blend consisting of 80% guar gum and 20% antimony sulfide were dispersed in 1980 g. of distilled water. The mixture was stirred two hours. A sol formed. Six 300 g. portions of this sol were weighed into 400 cc. beakers and to each was added, basis the weight of gum plus $Sb_2S_3$ present, $Na_2Cr_2O_7$ at levels of 0.5%, 0.17%, 1.0%, 2.0%, 4.0% and 8.0% respectively. The viscosity of each mixture was determined one hour after the oxidizing agent was added. The results are as follows:

| Sol No. | Percent $Na_2Cr_2O_7$ Added to Solution | Brookfield Viscosity,[1] cps., After 1 Hr. | Spindle Used |
|---|---|---|---|
| 1 | .05 | 1,375 | No. 3 at 20 r.p.m. |
| 2 | .17 | 3,450 | No. 3 at 20 r.p.m. |
| 3 | 1.0 | 100,000 | No. 7 at 20 r.p.m. |
| 4 | 2.0 | 100,000 | No. 7 at 20 r.p.m. |
| 5 | 4.0 | 100,000 | No. 7 at 20 r.p.m. |
| 6 | 8.0 | 90,000 | No. 7 at 20 r.p.m. |

[1] Brookfield Synchro-Lectric Viscometer—spindle and speed as shown.

Example 22

Ten grams of a blend consisting of 80% guar gum and 20% antimony oxide were dispersed in 1990 g. of water and stirred two hours. Six 300 g. portions were weighed into six 400 ml. beakers. To the sols were added $Na_2Cr_2O_7$ at levels of 0.1%, 0.5%, 1.0%, 2.0%, 4.0% and 8.0%, respectively, basis the weight of gum plus oxide present. The viscosities were found to be as follows:

| Sol No. | Percent $Na_2Cr_2O_7$ Added | Brookfield Viscosity, cps., After 1 Hr. | Spindle Used |
|---|---|---|---|
| 1 | 0.1 | 100 | No. 3 at 20 r.p.m. |
| 2 | 0.5 | 12,000 | No. 5 at 20 r.p.m. |
| 3 | 1.0 | 14,000 | No. 5 at 20 r.p.m. |
| 4 | 2.0 | 15,000 | No. 5 at 20 r.p.m. |
| 5 | 4.0 | 10,000 | No. 5 at 20 r.p.m. |
| 6 | 8.0 | 2,500 | No. 5 at 20 r.p.m. |

It is obvious from the above two examples that 1–2% of $Na_2Cr_2O_7$ basis the gum plus metal substance present is the most desirable level to use. When $H_2O_2$ was substituted for $Na_2Cr_2O_7$ in the above experiments, the most desirable level again was determined to be 1–2%.

In Example 23, there is described a gel made from guar and antimony oxide in saturated $NH_4NO_3$ solution. This gel was compared for water resistance to one made from a guar-borax complex.

Example 23

Five grams of a blend containing 80% guar gum and 20% antimony oxide were blended with 300 g. of dry ammonium nitrate prills. To the combined blend were added 200 g. of water at 200° F. and the mixture was stirred vigorously 1.5 minutes and allowed to stand 10 minutes when 2 cc. of 5% $Na_2Cr_2O_7$ were added. Upon adding the bichromate solution it became a gel. After allowing the gel to stand 24 hours it had 120,000 cps. viscosity as measured by a Brookfield Viscometer No. 7 spindle at 10 r.p.m. For comparison purposes another composition was made in which 5 g. of guar gum were blended with 300 g. of $NH_4NO_3$ prills and to this blend were added 200 g. of water at 200° F. The mixture was stirred 1.5 minutes and allowed to stand 30 minutes when 10 cc. of 2.5% $Na_2B_4O_7$ solution were added. Upon adding borax a gel formed. After 24 hours the borax crosslinked composition had 30,000 cps. viscosity as measured by a Brookfield Viscometer No. 6 spindle at 10 r.p.m.

Fifty grams of each gel composition were transferred to crucibles and each placed in an 800 cc. beaker filled with 500 ml. of water. The water was vigorously agitated using a power stirrer turning at 600 r.p.m. After two hours the composition crosslinked with borax had completely dissolved while after four hours, the composition crosslinked with antimony oxide and $K_2Cr_2O_7$ showed no loss.

Example 24

A sol was made by first blending 5 g. of an 80% guar gum—20% $Sb_2S_3$ mixture in 300 g. of $NH_4NO_3$ prills and adding to this belnd 200 g. of water heated at 200° F. The mixture was stirred and allowed to stand 10 minutes and then 3.5 cc. of a 3% $H_2O_2$ solution was added. After adding the oxidizing agent, the mixture was set aside 24 hours. A gel formed. The viscosity of this gel, now 24 hours old, was 64,000 cps. as measured by a Brookfield Synchro-Lectric Viscometer at 10 r.p.m., No. 6 spindle.

A portion of this gel was subjected to a water resistance test like the one described in Example 23. The gel lost no weight in 4 hours.

Example 25

Five grams of a blend containing 50% lithopone and 50% guar gum were dispersed in 500 cc. of water. To the dispersion were added 3 cc. of 3% $H_2O_2$ solution. A soft gel-like product formed. This was coated onto brown kraft paper and dried.

For comparison purposes a similar gel was made, but the $H_2O_2$ was not added. This also was coated onto brown kraft paper.

The two coated sheets were compared for water resistance by placing 1 cc. of water on each. The sheet coated with the composition containing $H_2O_2$ showed no water penetration in 1 hour whereas the sheet coated with the composition in which $H_2O_2$ was omitted showed penetration in 10 minutes.

Example 26

A blend of 2 g. guar gum and 2 g. $Fe_2O_3$ was dispersed in 200 cc. of water. The mixture was stirred 1 hour and 5 cc. of 5% $K_2Cr_2O_7$ solution were added. The sol changed to a soft tacky gel in 30 minutes.

One part of the gel was mixed with 9 parts of iron ore. After drying, the mixture became a hard pellet. This suggests the possibility of using gels of this type as binders for pelletizing taconite ore or as a chalk material.

As indicated, the percent gum by weight used in the sol may vary widely. In general, the sol will contain from 0.5% to 10% by weight of the gum product. As a practical matter, from 1 to 3% will be employed. However, for certain applications, it may be necessary to use amounts outside this range to provide a gel having certain properties required for the particular use. The amount of metallic sulfide or oxide employed may also be varied within a wide range to provide gels of differing properties. As indicated in the examples, the metallic sulfide or oxide may be employed in an amount of from 1% to in excess of 100% by weight based on the amount of gum product employed. Generally, at least 3% will be employed, the usual amount being from 10–50%. As a practical matter, it is generally not necessary to exceed about 20% although in certain applications, the requirements necessary may dictate the use of different amounts.

The level of oxidizing agent to use in a system consisting of gum, metallic sulfide or oxide and water also is an important factor. If the quantity of oxidizing agent is too little, the complex will not reach its maximum gel viscosity potential. If too much, the gels synaerese and break up. It is not generally necessary to employ the oxidizing agent in an amount outside the range of from 0.2 to 8.0% by weight based on the weight of gum and metallic sulfide or oxide, and usually, from 0.5 to 4% will be employed, the most desirable properties as a practical matter being reached at about 1–2%.

It is to be understood that this invention is not to be limited to the exact details of operation or the exact compounds shown and described, as obivous modifications and equivalents will be apparent to those skilled in the art and the invention is to be limited only by the scope of the appended claims.

The embodiments of the invention in which an exclusive property or privilege is claimed are defined as follows:

1. A composition which provides a gel with water consisting essentially of a gum selected from the group consisting of galactomannan, glucomannan, glucoxylogalactan and xylogalactan gums, from 1 to 100% by weight based on said gum of a metallic compound selected from the group consisting of the sulfides and oxides of metals selected from the group consisting of Sb, Zn, Mo, Cd, Pb, Bi, Mn, Ni, Co, Sn, Fe and Cu, and from 0.2 to 8% by weight based on said gum and metallic compound of an oxidizing agent.

2. A composition as defined in claim 1 in which said gum is a galactomannan.

3. A composition as defined in claim 1 in which said gum is a glucomannan.

4. A composition as defined in claim 1 in which said gum is a glucoxylogalactan.

5. A composition as defined in claim 1 in which said gum is xylogalactan gum.

6. A composition as defined in claim 1 in which said metallic compound is $Sb_2S_3$.

7. A composition as defined in claim 1 in which said metallic compound is $Sb_2O_3$.

8. A composition as defined in claim 1 in which said oxidizing agent is selected from the group consisting of alkali metal chromates and bichromates.

9. A composition as defined in claim 1 in which said oxidizing agent is employed in an amount of from 1–2% and said metallic compound is employed in an amount of from 10 to 50%.

10. A composition which provides a gel with water consisting essentially of (a) a polygalactomannan gum, (b) from 1 to 100% based on the weight of said gum of a compound seletced from the group of antimony sulfides and oxides and (c) from 0.2 to 8% by weight based on said gum and antimony sulfide and oxide of an oxidizing agent selected from the group consisting of alkali metal chromates and bichromates.

11. A composition as defined in claim 10 in which said oxidizing agent is employed in an amount of from 1 to 2%.

12. A process of preparing a gel comprising (1) dispersing in an aqueous medium to form a sol, a gum selected from the group consisting of galactomannan, glucomannan, glucoxylogalactan and xylogalactan gums, (2) adding to said sol from 1 to 100% by weight based on said gum of a metallic compound selected from the group consisting of the sulfides and oxides of metals selected from the group consisting of Sb, Zn, Mo, Cd, Pb, Bi, Mn, Ni, Co, Sn, Fe and Cu, and (3) subsequently adding thereto from 0.2 to 8% by weight based on said gum and metallic compound of an oxidizing agent to thereby form a gel.

13. A process of preparing a gel comprising (1) adding to a dry gum selected from the group consisting of galactomannan, glucomannan, glucoxylogalactan and xylogalactan gums a mixture of (a) from 1 to 100% by weight based on said gum of a metallic compound selected from the group consisting of the sulfides and oxides of metals selected from the group consisting of Sb, Zn, Mo, Cd, Pb, Bi, Mn, Ni, Co, Sn, Fe and Cu and (b) from 0.2 to 8% by weight based on said gum and metallic compound of an oxidizing agent and (2) dispersing the resulting product of (1) in an aqueous medium to thereby form a gel.

14. A process of preparing a gel comprising (1) blending a gum selected from the group consisting of galactomannan, glucomannan, glucoxylogalactan and xylogalactan gums with from 1 to 100% by weight based on said gum of a metallic compound selected from the group consisting of the sulfides and oxides of metals selected from the group consisting of Sb, Zn, Mo, Cd, Pb, Bi, Mn, Ni, Co, Sn, Fe and Cu, (2) dispersing said blend in an aqueous medium and (3) adding to the resulting dispersion from 0.2 to 8% by weight based on said gum and metallic compound of an oxidizing agent to thereby form a gel.

References Cited by the Examiner

UNITED STATES PATENTS

| | | | |
|---|---|---|---|
| 2,678,280 | 5/1954 | Noyes et al. | 106—209 |
| 2,801,218 | 7/1957 | Menaul | 252—8.55 |
| 2,874,545 | 2/1959 | Twining | 252—316 |
| 2,879,268 | 3/1959 | Jullander | 260—232 |
| 3,053,670 | 9/1962 | Nordin | 106—209 |

OTHER REFERENCES

"Concise Chemical and Technical Dictionary," ed. by H. Bennett, Chemical Pub. Co., Inc., Brooklyn, N.Y., 1947, p. 556.

JULIUS GREENWALD, *Primary Examiner.*